Patented Mar. 22, 1949

2,464,874

UNITED STATES PATENT OFFICE 2,464,874

METHOD OF MANUFACTURING AN OXIDE CATHODE FOR AN ELECTRIC DISCHARGE TUBE, AND DISCHARGE TUBE MADE ACCORDING THERETO

Robert Loosjes and Hendrik Jan Vink, Eindhoven, Netherlands, assignors to Hartford National Bank and Trust Company, Hartford, Conn., as trustee No Drawing. Application December 10, 1947, Serial No. 790,924. In the Netherlands November 13, 1946

Section 1, Public Law 690, August 8, 1946

2 Claims. (Cl. 316—17)

It is known to manufacture an oxide cathode in a separate space and, to coat it with a thin layer of copper, silver or gold, whereupon the cathode is incorporated in the tube proper and the layer of silver, copper or gold is vaporised from the cathode which is now ready.

This method has the advantage that no alkaline earth metal is vaporised in the tube proper. It exhibits the disadvantage that the cathode requires in general to be heated at very high temperatures in order to vaporise the protecting metal layer at a sufficient rate therefrom, which entails undesired sintering phenomena in the oxide layer.

Furthermore it is known to use for the protective layer polystyrene or other hydrocarbons, for instance paraffin, which are adapted to be vaporised at much lower temperatures but have the disadvantage of giving up comparatively large quantities of gases, for instance carbonic acid, due to which it is difficult to degasify the tube afterwards.

We have now found that the said disadvantages of a high vaporisation temperature of the protecting layer and development of detrimental gases can be avoided by making use of the following method.

According to the invention, in a method of manufacturing an oxide cathode in an electric discharge tube the alkaline earth metal(s) which, together with oxygen, will form the electron-emitting oxide layer, is provided in a thin layer on the carrier of this layer in a separate space, whereupon a protecting layer consisting of copper or an other metal is provided which, jointly with barium, forms a eutectic at temperatures below the activation temperature of the ultimate layer of alkaline earth metal oxide. Subsequently the cathode is incorporated in the ultimate tube and the cathode is heated in an oxygen atmosphere at a temperature of approximately 800° C., whereupon it is kept for some time at this temperature in a vacuum.

If the protecting layer consists of copper the layers of alkaline earth metal and copper, which are only a few microns thick, fuse together and form the eutectic of these metals. In this case, consequently, the alkaline earth metal also appears at the surface and is oxidised by the available oxygen, thus producing a layer of alkaline earth metal oxide containing finely divided copper. The after-heating in a vacuum serves to remove any oxygen that may be fixed by metals other than alkaline earth metal. Since a eutectic of the alkaline earth metal(s) forms even at a comparatively low temperature of the alkaline earth metal(s) it is not necessary to remove the copper by heating to a high temperature, so that undesirable sintering of the oxide layer cannot occur.

The unfinished cathodes coated with the protecting metal layer are resistant to moist air for a few days, to dry air even for a few weeks.

As a rule the protecting metal layer will be provided by vaporisation in a vacuum, but disintegration in a rare gas is also possible. However, care should be exercised that not too much heat is radiated at the same time, since in this case a eutectic forms already during vaporisation, which eutectic is not as resistant to the air as the cathode coated with the protecting metal layer.

In order that the invention may be more clearly understood and readily carried into effect, it will now be described more fully with reference to the following example.

A nickel cap having a flat upper surface of 8 sq. mms. is fitted in a vacuum space and covered, by vaporisation, with a layer of barium and strontium in a ratio of 60:40 atom per cent. the layer having a thickness of a few microns. Subsequently a layer of copper, 2 microns thick, is vaporised on to it, the cathode is fitted in the ultimate tube ad oxygen at a pressure of 0.015 mm. is admitted into the latter. The cathode is slowly heated to 800° C. and after a few minutes any residual oxygen is pumped off. After that the cathode is heated for 24 hours at 820° C., whereupon the saturation emission amounts to more than 2 amps. per sq. cm.

During operation the finely divided copper still present in the oxide layer evaporates partly from the cathode on to the other electrodes or the wall of the tube, and in part it is also absorbed by the subjacent layer.

What we claim is:

1. A method of manufacturing an electron emitting, alkaline earth metal oxide coated cathode for an electric discharge device, which comprises applying to the cathode carrier a thin layer of alkaline earth metal capable of forming the electron emitting oxide layer, superimposing upon said alkaline earth metal layer a thin layer of a protective metal capable of forming an eutectic with the alkaline earth metal at a temperature below the activation temperature of the alkaline earth metal oxide, then incorporating the so-coated cathode carrier in the discharge device, heating it in an oxygen atmosphere to a temperature of approximately 800° C., and maintaining it for several hours at such temperature in a vacuum.

2. A method of manufacturing an electron emitting alkaline earth metal oxide coated cathode for an electric discharge device, which comprises applying to the cathode carrier a thin layer of alkaline earth metal comprising barium, superimposing upon said layer a thin layer of copper by vaporization, then incorporating the so-coated cathode carrier in the discharge device, heating it in an oxygen atmosphere to a temperature of approximately 800° C., and maintaining it for about 24 hours at such temperature in a vacuum.

ROBERT LOOSJES.
HENDRIK JAN VINK.

REFERENCES CITED

The following references are of record in the file of this patent:

UNITED STATES PATENTS

| Number | Name | Date |
|---|---|---|
| 2,362,510 | Stutsman | Nov. 14, 1944 |